United States Patent
Radl

(10) Patent No.: US 8,457,767 B2
(45) Date of Patent: Jun. 4, 2013

(54) SYSTEM AND METHOD FOR REAL-TIME INDUSTRIAL PROCESS MODELING

(76) Inventor: Brad Radl, Chardon, OH (US)

( * ) Notice: Subject to any disclaimer, the term of this patent is extended or adjusted under 35 U.S.C. 154(b) by 338 days.

(21) Appl. No.: 12/983,054

(22) Filed: Dec. 31, 2010

(65) Prior Publication Data

US 2012/0173004 A1 Jul. 5, 2012

(51) Int. Cl.
*G05B 13/02* (2006.01)
*G05B 21/02* (2006.01)
*G06F 7/60* (2006.01)
*G06F 17/10* (2006.01)
*G06F 15/18* (2006.01)
*G06F 17/00* (2006.01)
*G06E 3/00* (2006.01)
*G06N 5/02* (2006.01)

(52) U.S. Cl.
USPC ........ 700/49; 700/29; 700/73; 703/2; 706/20; 706/23; 706/48

(58) Field of Classification Search
USPC ........... 700/29, 31, 49, 73; 703/2; 706/14–16, 706/18, 20, 23, 45–48
See application file for complete search history.

(56) References Cited

U.S. PATENT DOCUMENTS

| | | |
|---|---|---|
| 4,979,126 A | 12/1990 | Pao et al. |
| 5,111,531 A | 5/1992 | Grayson et al. |
| 5,167,009 A | 11/1992 | Skeirik |
| 5,224,203 A | 6/1993 | Skeirik |
| 5,282,261 A | 1/1994 | Skeirik |
| 6,363,289 B1 | 3/2002 | Keeler et al. |
| 6,516,092 B1 * | 2/2003 | Bachelder et al. ............ 382/181 |
| 6,805,099 B2 | 10/2004 | Malaczynski et al. |
| 6,807,535 B2 * | 10/2004 | Goodkovsky ................... 706/3 |
| 7,164,954 B2 | 1/2007 | Lefebvre et al. |

(Continued)

OTHER PUBLICATIONS

Jing Deng et al., "A Fast Automatic Construction Algorithm for Kernel Fisher Discriminant Classifiers", 2010 49th IEEE Conference on Decision and Control (CDC), Publication Year: 2010, pp. 2825-2830.*

(Continued)

*Primary Examiner* — Crystal J Barnes-Bullock
(74) *Attorney, Agent, or Firm* — Clifford Kraft

(57) ABSTRACT

The present invention presents two new model types and a new method for evaluating a model used in the control application. These include a compound model, a hybrid model and a directional change coefficient model. The present invention allows the mixing of models with different inputs and outputs and the switching between these models based criteria for measuring optimization accuracy. The present invention allows switching between these models. The compound model is a model type that allows zooming in on the process to model parts of the data space with higher fidelity or resolution without loosing the capability to model the complete data space. The modeler does not loose any functionally over a regular neural network, but instead gains the ability to define the conditions when the model should use network weights best matched to the defined local conditions. The hybrid model is an extended version of a compound model. A hybrid model allows the combining of one or more models into a single model for purposes of interrogation or optimization. Within the hybrid model may reside a compound model itself. The directional change model (DCC) allows better evaluation of the predictive capability of Compound Models. It may also be used with any other model type.

20 Claims, 7 Drawing Sheets

U.S. PATENT DOCUMENTS

| | | |
|---|---|---|
| 7,194,320 B2 | 3/2007 | Lefebvre et al. |
| 7,219,087 B2 | 5/2007 | Panfilov et al. |
| 7,400,935 B2 | 7/2008 | Lefebvre et al. |
| 7,739,651 B2 * | 6/2010 | Melvin et al. ............ 716/50 |
| 8,180,603 B2 * | 5/2012 | Blessing et al. ........... 703/2 |
| 2005/0086635 A1 | 4/2005 | Parikh et al. |
| 2012/0137367 A1 * | 5/2012 | Dupont et al. ............ 726/25 |

OTHER PUBLICATIONS

R.N. Mahdi et al., "Model Based Unsupervised Learning Guided by Abundant Background Samples", Seventh International Conference on Machine Learning and Applications, Publication Year: 2008, pp. 203-210.*

* cited by examiner

Demo_compound

File   Edit   Tools                                         | Save | Save as | Close |

| Configure I/O Min Max  Actual vs. Predicted |

Neural Structure & Training   Cluster Def.   Train & Test Errors

Network Structure

| Network Type | Regular ▼ |
|---|---|
| Hidden Layers | 40 |
| | Enter num. of nodes in each layer |
| Hidden Act. Func. | Sigmoid ▼ |
| Output Act. Func. | Tanh ▼ |
| Input Norm. Range | -1 to 1 ▼ |
| Output Norm. Range | -1 to 1 ▼ |

Training:

| Learning Rate: | 0.01 |
|---|---|
| Momentum: | 0.8 |
| Max. Iteration: | 2000 |
| Max. Error: | 0.02 |

Reuse Weights ☐   Autosave after suc. training ☐
Auto stop training if test error increases after reaching

| Training file: | \grif\data_train | Browse | 0.022 |
| Test Data: % | 5 | | |

[Start Training]                                    [Batch Trainer]

FIG. 3

```
┌─────────────────────────────────────────────────────────────┐
│  ┌─────────────────────────────┐                            │
│  │  Demo_compound              │                            │
│  ├─────────────────────────────┴──────┬────┬───────┬─────┐  │
│  │ File  Edit  Tools                  │Save│Save as│Close│  │
│  ├────────────────────────────────────┴────┴───────┴─────┤  │
│  │ Configure I/O Min Max  Actual vs. Predicted           │  │
│                                                              │
│  Neural Structure & Training  Cluster Def.  Train & Test Errors │
│                                                              │
│  Network Structure                                           │
│                                                              │
│      Network Type          ┌──────────────────────────┬─┐   │
│                            │ Regular                  │▼│   │
│      Hidden Layers         ├──────────────────────────┴─┤   │
│                            │ Trigonometric Functional Link│  │
│                            │ Exponential Functional Link │   │
│      Hidden Act. Func.     │ Chebyshev Polynomial Func Link│ │
│      Output Act. Func.     │ Tanh                     │▼│   │
│      Input Norm. Range     │ -1 to 1                  │▼│   │
│      Output Norm. Range    │ -1 to 1                  │▼│   │
│  Training:                                                   │
│                                                              │
│      Learning Rate:        │ 0.01    │                       │
│      Momentum:             │ 0.8     │                       │
│      Max. Iteration:       │ 2000    │                       │
│      Max. Error:           │ 0.02    │                       │
│                                                              │
│        Reuse Weights  ☐  Autosave after suc. training  ☐    │
│      Auto stop training if test error increases after reaching│
│      Training file:     │\grif\data_train│ Browse │ 0.022 │  │
│      Test Data:  %      │ 5              │                   │
│                                                              │
│      │ Start Training │              │ Batch Trainer │       │
│                                                              │
└─────────────────────────────────────────────────────────────┘
```

FIG. 4

Demo_compound

File   Edit   Tools                              | Save | Save as | Close |

Configure I/O  Min Max  Actual vs. Predicted

Neural Structure & Training   Cluster Def.   Train & Test Errors

| Max age of data | 0 |
| Min patterns per cluster | 10 |
| Max patterns per cluster | 2000 |

Purge data rows with % difference <  2 ▲▼

Cluster Definitions

Define using: | Breakpoints |
              | Breakpoints Min Max |

| Variable Name | Breakpoint 1 | Breakpoint 2 | Breakpoint 3 |
|---|---|---|---|
| Unit Load | 600.0 | | |
| A_COAL_FEDERATE | 55.0 | | |
| B_COAL_FEDERATE | 55.0 | | |
| C_COAL_FEDERATE | 55.0 | | |
| D_COAL_FEDERATE | 55.0 | | |
| E_COAL_FEDERATE | 55.0 | | |
| F_COAL_FEDERATE | 55.0 | | |

[Add] [Insert] [Remove]

FIG. 5

| Cluster Name: | Cluster_Name | | | |
|---|---|---|---|---|
| Variable Rangers | | | | |
| Input | Min | Max | Use Min | Use Max |
| UNIT_LOAD | 0 | 0 | ☐ | ☐ |
| CO_5MIN_2MIN_LAG | 0 | 0 | ☐ | ☐ |
| OXY_GEN | 0 | 0 | ☐ | ☐ |
| WB_F_DP | 0 | 0 | ☐ | ☐ |
| SOFA_1 | 0 | 0 | ☐ | ☐ |
| SOFA_2 | 0 | 0 | ☐ | ☐ |
| SOFA_3 | 0 | 0 | ☐ | ☐ |

OK  Cancel

FIG. 6

| Demo_compound | |
|---|---|
| File  Edit  Tools | Save | Save as | Close |
| Configure I/O Min Max  Actual vs. Predicted | |
| Neural Structure & Training  Cluster Def.  Train & Test Errors | |
| Cluster | NOX_2MIN_LAG |
| Cluster 0 1 0 1 1 1 0 | 0.201, 0.006 (16) |
| Cluster 0 0 1 1 1 1 0 | 0.203. 0.004 (14) |
| Cluster 0 1 1 1 1 1 0 | 0.050, 0.059 (23) |
| Cluster 0 1 1 0 1 0 1 | 0.0124, 0.004 (4) |
| Cluster 0 0 1 1 1 0 1 | 0.156, 0.019 (21) |
| Cluster 0 1 1 1 1 0 1 | 0.012, 0.066 (169) |
| Cluster 1 1 1 1 1 0 1 | 0.081, 0.060 (134) |
| Cluster 0 0 0 0 0 1 1 | ☐, ☐(0) |
| Cluster 0 1 0 1 0 1 1 | 0.512, 0.001 (7) |
| Cluster 0 0 1 1 0 1 1 | 0.280, 0.014 (15) |
| Cluster 0 1 1 1 0 1 1 | 0.099, 0.124 (365) |
| Cluster 1 1 1 1 0 1 1 | 0.085, 0.102 (151) |
| Cluster 0 0 0 0 1 1 1 | 0.310, 0.003 (7) |
| Cluster 0 1 0 0 1 1 1 | 0.218, 0.015 (18) |
| Cluster 0 0 1 0 1 1 1 | 0.063, 0.038 (28) |
| Cluster 0 1 1 0 1 1 1 | 0.092, 0.104 (172) |
| Cluster 1 1 1 0 1 1 1 | 0.075, 0.053 (155) |
| Cluster 0 0 0 1 1 1 1 | 0.128, 0.126 (905) |
| Cluster 0 1 0 1 1 1 1 | 0.099, 0.099 (633) |
| Cluster 1 1 0 1 1 1 1 | 0.078, 0.106 (45) |
| Cluster 0 0 1 1 1 1 1 | 0.149, 0.143 (1237) |
| Cluster 1 0 1 1 1 1 1 | ☐, ☐(0) |
| Cluster 0 1 1 1 1 1 1 | 0.118, 0.116(1381) |
| Format: Train Error, Test Error (Num. pats used for testing) | |

FIG. 7

SYSTEM AND METHOD FOR REAL-TIME INDUSTRIAL PROCESS MODELING

BACKGROUND

1. Field of the Invention

The present invention relates generally to modeling power applications and more particularly to a system and method for real-time modeling of plant control for a wide range of physical and information processing applications such as combustion control, SCR optimization, FGD optimization, fuel blending, ash control, precipitator optimization, equipment diagnostics for mills, blowers, fans, transformers and the like as well as power grid modeling for optimization of power flow and trading. All these applications models can be coupled with optimization in a power plant or distribution grid.

2. Description of the Prior Art

Computing technology is advancing at a rapid pace permitting more powerful algorithms and complex strategies to be implemented to more efficiently control a process. Increasingly a shift in automation is occurring from controlling mundane repetitive tasks to controlling those of higher order complexity that previously would have to have been simplified by human operators to achieve timely response. The increasingly complex tasks can be automated to assist, complement or take direct or indirect control over process and business operations that before were only manually adjusted.

Process control, especially power plant control, involves both continuous processes (e.g. heating water) and discrete processes (e.g. turning a motor on/off). Generally, this involves using input data from physical sensors or manual input to determine the controller's reaction to achieve a goal or output. Such input data may be used directly from sensors or manual inputs, or some of this data may be pre-processed in some form and collected from data bases, software programs, memory or registers in hardware or other ways of moving and transforming raw data into desired information. The goal may be direct, such as control a temperature, pressure, flow, specific octane, motor, or in business, initiate a trade or the like, or it may more abstract, such as maximizing profit or the life of equipment.

Process control requires the representation and movement of information, a model of the data, and a way to evaluate the success of achieving the goal or objective. With more complex process control, the latter is often termed in the art optimization. Process control can be a physical process or an abstract process. In a power plant, many times it is a direct physical process that controls the operation with possibly abstract goals of keeping costs down, maximizing output or profit, extending the useful life of equipment and the like.

Simple models can often be represented by regression, a simple set of physical relationships or a set of equations. As the data becomes less accurate, or the relationships are unknown, empirical models, such as fuzzy logic and neural networks may be used. Many different strategies are used to train these parametric models (neural networks and regression models) and then to select the models to be used.

One of the challenges is that often the process is changing, evolving, being modified, or is otherwise is dynamic. Also, many states may exist that are rarely encountered or that the model has not previously encountered. It becomes a challenge to build models and optimizers that can cover such a wide range of states and achieve close to a truly optimized target. Also, disparate data sources may be required for building models and optimizers.

It is also many times a challenge to gather sufficient data to train models. Traditional methods of operator directed testing and automated testing can be very expensive and time consuming, and may not adequately address the issue of the change process. Prior art methods including model swapping was pioneered by Pegasus Technologies in 1996 where one model is used for control, while another model is being trained on new data generated by the model in control. When a particular swapping criteria is met, the indirect model is moved into the place or the control model.

Prior art solutions tend to be focused on a particular problem and then designing a tool or toolset that can be adapted to that problem. Often these solutions are dynamically adaptive, i.e. responsive to changes in the system behavior in real-time or close to real-time. Generally they require the use of multiple models, necessitating either a dynamic switching of models or an averaging of model results.

In U.S. Pat. Nos. 5,167,009 (and 5,224,203), Skeirik teaches the use of on-line process control using neural networks with data pointers for direct control. In U.S. Pat. No. 5,111,531, Grayson et. al. teaches the use of neural networks as indirect controllers.

There have been several improvements in the art to handle particular classes of problems. Examples include: U.S. Pat. No. 4,979,126 which combines several previously independent aspects of neural networks, including supervised learning, unsupervised learning along with functional link enhancement and U.S. Pat. No. 5,282,261 which includes a usage of neural networks to predict product properties or values in place of a directly measured variable.

Other prior art modifies the neural network component to achieve different type of information processing. For example, in U.S. Pat. No. 6,363,289, Keeler et. al, teach how to use networks to be trained on the residual error left after subtracting from the actual state variable. In U.S. Pat. No. 7,219,087, Panfilov, et. al. teach the use of a Fuzzy Neural Network for controlling a power plant. In U.S. Pat. No. 6,805,099 Malaczynki, et. al teach how to use wavelet transforms to extract critical signal features for neural net combustion sensing. In U.S. Pat. Nos. 7,164,954 (and 7,194,320), LeFebvre et al. teach implementing a indirect controller using a committee of models, whereby the user can keep a number of distinct models and either average the outputs or swap models when performance is poor the models in use.

It would be advantageous to have models that are more flexible that adapt to incoming data from any source and quality. Models that recognize data problems like data sparsity and automatically adjust internal weights would offer continuous improvement over model swapping and non-dynamic model configurations. In addition, the ability to mix model types, both in structure for neural networks and in model type in general, would enable more powerful and accurate data interrogation and optimization strategies.

In addition, the creation of a new criteria for measuring the optimization capability, the Directional Change Correlation index, allows for models that perform better under a much wider set operating conditions than previous advances and provide a new method of evaluating models suitability for control. Using any of these advances, in part or in whole, would advance the are of optimization. In summary, these adaptations should allow for higher fidelity models that then permit a better optimization using the traditional techniques.

SUMMARY OF THE INVENTION

The present invention provides two new model types and a new method for evaluating the model used in a control application. Among these are a compound model, a hybrid model and a directional change coefficient model. The present invention allows the mixing of models with different inputs and outputs and the switching between these models based on criteria for measuring optimization accuracy. The compound model is included which is a model type that allows zooming in or out. When a power plant or other process has sufficient data in an operating data space, the model switches to a higher fidelity mode or resolution without loosing the capability to model the complete data space. If data is sparse, the model zooms out, switching to a lower fidelity model with sufficient data to provide predictive capability sufficient for optimization. The modeler does not loose any functionally over a regular neural network, but instead gains the ability to define the conditions when the model should use network weights best matched to the defined local conditions.

The hybrid model may incorporate one or more compound models, or any other model type, including but not limited to first principals, regression models, any variety of neural networks models. A hybrid model allows the combining of one or more models into a single model for purposes of interrogation or optimization. The component models are not required to have the same inputs or outputs; instead the system will automatically determine the appropriate overlap when doing optimization. Within the hybrid model may even reside within another hybrid model. For example, a hybrid model, with models of NOx, Heat Rate and CO for a power plant, may then be fed into a higher order hybrid model of multiple power plants. Theoretically, there is no limit to the number of hierarchical hybrid and compound models layers, and their combination with other model types, empirical or equation based. The hybrid model can often be used when one model type or structure does not fit well for all outputs. For example, a compound neural network may be good for a NOx model, while the CO model requires a regression model, or even just a different neural network structure than the NOx model.

The directional change model (DCC) allows better evaluation of the predictive capability of Compound Models. It may also be used with any other model type. All known tools for evaluation neural networks and other models focus on the accuracy of prediction. For process where the goals are to minimize or maximize a value this is not necessarily the best case. This is especially true for those models involving high data uncertainty, missing data variables, or potential step changes (e.g. equipment breakage/replacement, calibration event, new feedstock, etc.) The ultimate power of the model for optimization is the ability to predict the correct direction of change for the desired goal should you make changes to one or more inputs.

DESCRIPTION OF THE FIGURES

Attention is drawn to several drawings that illustrate features of the present invention:

FIG. 3 is a control panel for modeling a neural network.

FIG. 4 is a neural network control panel that allows entry of breakpoints.

FIG. 5 is a panel that allows definitions of clusters.

FIG. 6 is a panel that shows training errors.

FIG. 7 shows a list of clusters used in training.

Several drawings and illustrations have been presented to aid in understanding the present invention. The scope of the present invention is not limited to what is shown in the figures.

DESCRIPTION OF THE INVENTION

The present invention relates to a real-time modeling tool for power plants and other processes or businesses. The tool can be operated stand-alone (offline) or directly and/or indirectly coupled into the process being modeled and/or controlled. A modeler can choose a particular technique for a particular process, or can select between several different techniques. It is also possible to combine techniques.

Figure 1:
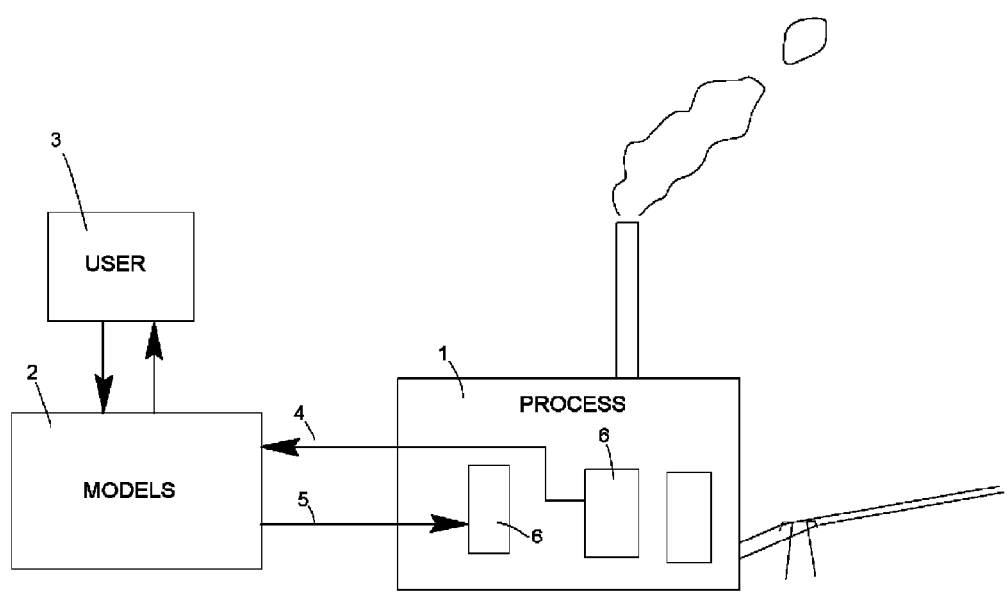
FIG. 1 shows block diagram of the present invention attached to sensors and controls in a power plant.

FIG. 1 shows schematically an embodiment of the present invention directly connected to a power plant 1 control system 6. The model 2 can run on a modeling computer that is electrically connected to input/output ports 4 that can be tied directly into various plant sensors and can directly drive various plant drive lines 5. The model 2 can directly interface with the user 3 or can be connected over a network.

Figure 2:
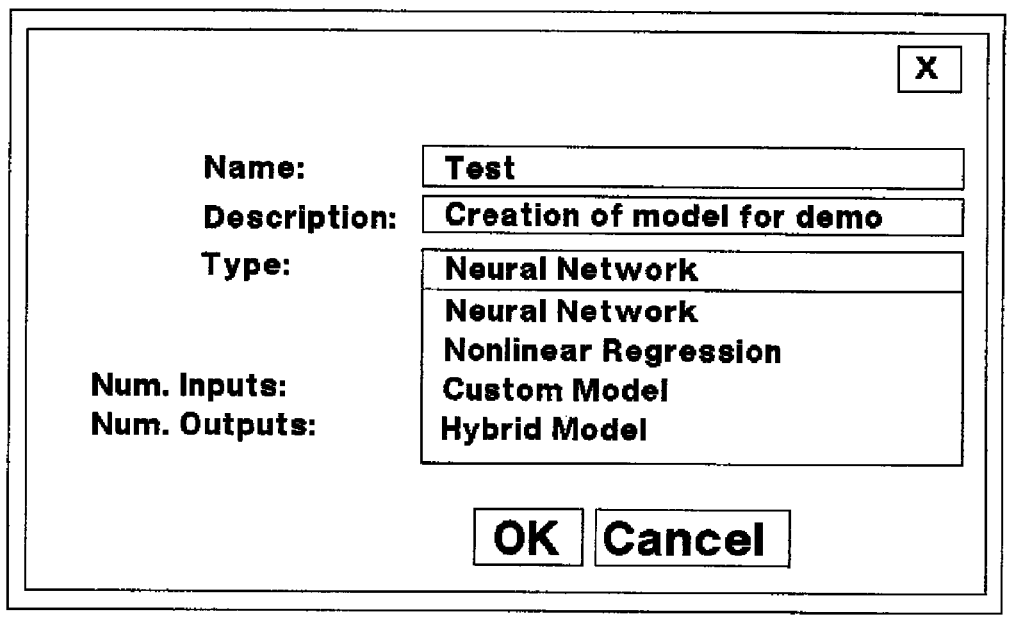
FIG. 2 is a modeling control panel that allows section of various models.

FIG. 2 shows a model control panel that allows selection of various different models. This panel shows choices between a neural network, a compound neural network, non-linear regression and a hybrid model.

Compound Model

The first mode of operation of the present invention is the compound model. As previously stated, the compound model is a model type that allows zooming in on the process to model parts of the data space with higher fidelity or resolution without loosing the capability to model the complete data space. The modeler does not loose any functionally over a regular neural network, but instead gains the ability to define the conditions when the model should use network weights best matched to the defined local conditions.

In a compound model, the user defines logical boundary conditions and a set of criteria defining an acceptable amount of data for that space. FIG. 3 shows a model control panel that allows the compound modeler to select a network type for the compound model. One of the implementations of these models sorts the incoming data for these data spaces and saves them in clusters of data. FIG. 4 is a model control panel that allows definitions of clusters. The compound model has the ability to build sub-models (models within a model). Clusters can be used to train these sub-models. Clustering is a way to sort a data file for training without manual intervention. A user can clean data, where cleaning data is generally the removal of outlying data or data not of interest to the model to be developed. The user can also define the boundary condition to sort it into operational categories. A user can select a maximum age of data, usually in days, where any data older than this will be excluded from the model. Also, a user can select the minimum number of patterns that need to be in a cluster before the compound model will train a particular sub-model. Meeting the minimum threshold, effectively enables the zoom capability of the model. Optionally, if this threshold is not met, the sub-model is not created; however, the data can still be used in a default model for modeling the complete data space. The user can also select the maximum number of patters per cluster, which typically results in data being purged on a FIFO or time basis. An optional purge tool can delete old rows of data that are very similar to new rows. The purge tool can operate on many different criteria of 'sameness', but typically this is having the parameters fall with a deadband or via a grouping function such as radial basis functions. The user can specify a difference threshold often a simple percentage parameter.

While it is not necessary to save cluster data, it can be helpful to save this data for other data investigations and/or the building of hierarchical models or traditional stand-alone models. In either case, stored or non-stored data, when the model is interrogated for any reason, it checks to see if sufficient data is present in the local space for use of the model's weights for this space. If yes, the model then uses these weights, effectively zooming in on this local area allowing for finer grain interrogation and potentially better accuracy then could be achieved with a global model. Should insufficient data be present, the model would zoom out and use the weights for the next larger set of boundary conditions. While not allowing for the higher resolution model interrogation, this does permit the ability to zoom to a level where a valid model is present and depending on user criteria, the interpretation of data space between local conditions with lots of data. Theoretically, extrapolation may also be done, but this must be done carefully either with prior knowledge of the physical or business process conditions, or using statistical techniques to determine likely range for potential extrapolation, or through the boundary conditions input for the default model, or the boundary conditions as merged for all the sub-models.

The user of the compound model may define the model using breakpoints. Breakpoints are the boundary conditions. This example used fixed criteria which is typically used for defining models of processes with known operating boundary conditions. A simple example, would be whether a mill is on in a power plant. The boundary conditions could be dynamically determined for less deterministic models, such as grouping transformers in a power grid model. FIG. 5 shows a model control panel that can be used for setting break points in the process. A user should not set too many breakpoints since breakpoints create a factorial of conditions; though this is computation limitation not a math limitation. Through the use of cloud, grid or other like computing platforms the number of breakpoints can be increased. For example, 7 breakpoints can result in 5040 different combinations. Breakpoints should generally be limited to step changes in conditions (for example a unit going out of service, the NOx, Heat Rate and CO all shift to a different profile), but in some models, such as power flow modeling, they may need to be dynamically determined based on physical parameters such as total power flow in a region. The present invention creates data files for each cluster that can be used for that cluster's modeling or for other data investigations.

While not a precondition, a compound model will normally have a default model (global model) which is a model of all the potential data space covered by the overall model being built. This default model could be built on all data provided the model. Alternately, a stronger implementation will sort this data based on user boundary conditions. This sort would place an upper limit on the number of patterns retrained for the boundary conditions, so that a particular condition does not dominate the system weights. Default models are very useful for continuous processes where test data is expensive to generate, yet the user wants to have a model available for optimization, should these unusual conditions occur. When the compound model is used to estimate values, whether off-line (predictive mode) or in real-time (optimization mode), the model can automatically determine whether to use a sub-model or the default model based on the input pattern submitted. Tools allowing merge data from other systems that have collected data on data of interest whether normal operation or non-normal operation are very useful for increasing the zoom capability of the compound model.

Additionally, the compound model may be combined with a data cleaner operation, either embedded in the model or in a separate step. The data cleaner would permit the pruning of the data set of outlying data. Outlying data may be defined simply as Min. and Max. values. Outlying data also may be determined through the use of statistical techniques evaluating probability and/or combined with equations defining known relationship or relationship boundary value conditions.

As the compound model runs, there may be various training errors. FIG. 6 shows a panel with training errors. There may not be enough patterns in a cluster to train that cluster. The default model may have had to be used. FIG. 7 shows a result panel with a number of clusters used in a particular model.

Hybrid Model

A hybrid model allows the combining of one or more models into a single model for purposes of interrogation or optimization. Within the hybrid model may reside a compound model itself. Theoretically, there is no limit to the number of hierarchical compound models layers, and their combination with other model types, empirical or equation based. The hybrid model can often be used when one model type or structure does not fit well for all outputs. Historically, a hybrid model has been used to cover a physical model with a neural network model, where the physical model (first principal model) incorporate available prior knowledge about the process being modeled, with a neural network which serves as an estimator of unmeasured process parameters that are difficult for the physical model. (ref: A Hybrid Neural Network-First Principles Approach to Process Modeling, Dimitris C. Psichogios and Lyle H. Ungar, AIChE Journal, October 1992, Vol. 38, No. 10 pg 1499-1510). In this invention, the hybrid model may have any model type, any number of model types, and any mix of weights/structures with model, and may include one or more compound models.

One example within a power plant would be where you want to model, NOx, CO, and Heat Rate (HR). The NOx may be modeled by the a neural network with 80 inputs and 40 Hidden layers of with sigmoidal activation function and linear output function. The HR may be best modeled with 120 inputs, a functional link expansion, and 60 hidden layers with Gaussian activation functions and tangential output functions. The CO is perhaps modeled best by simple polynomial regression, with 75 inputs. The Hybrid model in this invention allows a user to combine all three distinct model types into one comprehensive model which may be used for interrogation and optimization. In the case of optimization, the system automatically determines the overlap for the desired control settings and uses the models as appropriate for determining the optimum settings. In this example, say NOx has inputs A,B,C, as settings to be optimized (i.e. can be controlled directly or indirectly. HR, has B, C, D, E, F, and CO has B,C,E. In this case, the optimizer can either handle this explicitly or through the hybrid model it is handle automatically, such that, parameter A is exclusively driven by the NOx model, parameters D and F by the HR exclusively, parameter B and C are traded-off (optimized) among all three models, and parameter E is optimized among the HR and CO model.

When a hybrid model is incorporates a compound model, this automatic trade-off (optimization) is enhanced, by having the compound model auto-zoom when appropriate within its model space to offer superior resolution of the model being interrogated. Multiple compound models can be used with a hybrid model.

The use of the hybrid model and compound model combination allows highly complex situations to be modeled and optimized using the combination of first principals and parametric models that best fit the process.

There are scenarios where even the same output may want to be modeled using the different model techniques, and using this compound model type in optimization. A rough example, would be a trading strategy for power bids, where there is a known set of equations, that captures some of the dynamics of trading, but has also known deficiencies in some area that have yet to quantify or are too difficult to quantify. Conversely, they may also have an empirical model (e.g. a neural network) for the same trading, but it has not been tested under all conditions or has other limitations, that leave this model incomplete also.

DCC Model

As previously stated, the directional change model (DCC) allows better evaluation of the predictive capability of Compound Models and Hybrid Models. It may also be used with any other model type, whether first principles or parametric. Examples include, at a power plant, all inputs into a model may predict a NOx value of 0.25 and match the measured NOx value for that period. A buyer then switches coal and for the same input the NOx is now 0.35. Under the traditional scenario, the models would be retrained in some fashion, and likely over an extended period of time to such that the first set of models predict ~0.25 and the second set predict ~0.35. This neglects to some degree the optimization. If the goal is minimization, the first model may lower NOx to 0.22, but the second one is incapable of lowering NOx for a few months, hence the NOx may go to 0.37 before all the new data is accumulated. Further, conditions may shift again before the retraining ever takes to sufficiently permit a NOx reduction. This may also be true for a business trading application to maximize profit on power sales, and the difference that may arise between one day with trading during a 100 degrees F. weather, and the following day at 70 degrees F. and rain.

The important criteria for these models are really whether they will minimize NOx under the widest range of conditions (or other examples, maximize profits under the widest range of conditions or minimize line failure risk associated with power loading). Therefore, the present invention contains a measure for how often the direction of the recommendation is or would have been correct.

For the DCC, the system looks at contiguous passes of data. Data may include time-lagged parameters, abstract parameters, etc. This may be $t_1, t_2, t_3$, type data, it may be an average, or otherwise processed, as long as it retains the essential characteristics that the previous data pass may have an effect on or a relation to in the next pass of data. The simplest is time series data where changes at time $t_n$, will have an impact on data time $t_{n+1}$.

In the simple example of a $t_1$, $t_2$ measure, the technique uses the model to predict output(s) at time $t_1$ and $t_2$. It then computes the difference, and if using a deadband, determines if there is a significant change in the output(s). For example, if the output at $t_1$ was predicted to be 0.25 and $t_2$ was predicted to be 0.22, and the deadband is 0.01, then there is an expectation that the parameter would be lower for the set of changes. If $t_2$ was 0.245, there would be no expectation, and this would not normally be used in the final result. If the value is 0.28, then there is an expectation that the parameter would be higher for the set of changes. After this prediction, the actual data has the same comparison made. For example, if at $t_1$ the actual data was 0.35, and at $t_2$ the actual data was 0.31, with a deadband of 0.01, then the real direction of change was lower. This is then compared to the expectation from interrogating the models. If the model, predicted a lower value (i.e the example of 0.025 to 0.22) then the models predictive power is treated as correct. If the model prediction was neutral or a higher value, the predictive power is treated as incorrect.

In the simplest embodiment of this technique, a user would track all correct and non correct predictions (of direction of change), and output a percent correct measure. The important feature is that the user gets a model focused on predictive power, not accuracy. Models may have very high accuracy but no predictive powers. In many cases, with incomplete knowledge and/or data, the models result in sub-optimal and sometimes detrimental optimization because they did not take into consideration the generalized predictive capability of the model.

The DCC can be readily expanded into other statistical measures, such as, but not limited to an r2 on the accuracy of the delta change, sigmas on the change, weighted averages of DCC versus operating data space and the like. One powerful is to create an output equation or plot for various DCC deadbands. When at the noise level of the data the chart will start at or about 50% of the data and then progress steadily upwards towards 100% predictive capability (at the higher deadbands). These multiple level DCC are very well adapted to use in fitness functions for any model training.

DCC Expanded Example

The following example has been chosen to illustrate the DCC model. The numbers are for example only. The scope of the present invention is not limited to any numbers given or predicted.

| A | B | C | Pred. C | | Meas. |
|---|---|---|---|---|---|
| 10 | 10 | 20 | 22 | | |
| 11 | 11 | 24 | 24 | Act. Dev. +4, Pred. Dev. +2; Same direction OK. | 1.00 |
| 9 | 11 | 22 | 25 | Act. Dev. −2, Pred. Dev. +1; Not OK | 0.50 |
| 8 | 9 | 20 | 24 | Act. Dev. −2, Pred. Dev. −1; OK | 0.67 |
| 7 | 8 | 18 | 21 | Act. Dev. −2, Pred. Dev. −3; OK | 0.75 |
| 10 | 10 | 18 | 22 | Act. Dev. 0, Pred. Dev. +1; Not OK | 0.60 |

A and B are inputs, C output, (assume 0.00 deadband on prediction.
Final Result is model with 60% correlation (0.60).

This indicates that a deadband be added. For example, if the deadband is 1.01 the last pass of data would not count positive or negative, as the actual change of 0 or the Predicted change of +1 were not 'significant' to measure. This works best for data in sequence; however, it can be used under most all circumstances.

It should be noted that in any of the models, the present invention generally allows pruning of sensor data (or sensors) and the addition of sensor data (or sensors). This can be done when sensor data may not be valid or any longer useful, or when a new sensor comes online. Actuators and/or control lines may also be pruned or added.

It should also be noted that in any of the models, it is possible to interact with several totally independent control systems supplied by different suppliers. It is possible for the present invention to interact and control with no dependency between the independent control systems (i.e. no exchange of date between the systems), or it is also possible to allow dependent actions between the independent control systems.

It is also possible with the present invention to use merged or mixed models (combined or mixed models such as a neural network and a physical model). Merged or mixed models can occur in hybrid models or in any other model.

Several descriptions and illustrations have been presented to aid in understanding the present invention. One skilled in the art will realize that numerous changes and variations are possible without departing from the spirit of the invention. Each of these changes and variations is within the scope of the present invention.

I claim:

1. A modeling system adapted to control a particular industrial process comprising:
   a plurality of sensors coupled to said industrial process;
   a plurality of control lines coupled to said industrial process;
   a computational engine configured to read said plurality of sensors and command said control lines;
   said computational engine adapted to run a plurality of predetermined models relating to a data space within said industrial process, said computational engine also adapted to create sub-models from said predetermined models based on predetermined data thresholds, wherein a particular sub-model is created and trained if a number of data patterns exceeds one of said thresholds and said particular sub-model is not created if said number of data patterns does not exceed said threshold.

2. The modeling system of claim 1 further comprising a default model adapted to model an entire data space.

3. The modeling system of claim 1 adapted to receive user data defining said data space.

4. The modeling system of claim 1 adapted to receive user input determining an acceptable amount of data for said data space.

5. The modeling system of claim 1 wherein said computational engine sorts incoming data for said data space and saves said data as clusters.

6. The modeling system of claim 1 wherein outlying data is removed from said data space.

7. The modeling system of claim 1 wherein older data is removed from said data space according to predetermined age criteria.

8. The modeling system of claim 1 wherein said computational engine creates a hierarchy of sub-models of increasing resolution.

9. The modeling system of claim 1 adapted to combine of one or more models into a single model for interrogation or optimization.

10. The modeling system of claim 1 wherein at least one of said models is a evaluated by a directional change coefficient model (DCC).

11. The modeling system of claim 1 wherein said computational engine can use any combination of available inputs and outputs.

12. The modeling system of claim 1 wherein model types may be mixed.

13. The modeling system of claim 1 which allows pruning or addition of sensor data.

14. A computational modeling engine directly attached to an industrial process comprising:
    at least one input sensor directly attached to said industrial process, wherein said input sensor provides real-time data from said industrial process, and wherein said computational modeling engine can read said data from said input sensor;
    said computational modeling engine adapted to run at least one predetermined model relating to a data space within said industrial process, said computational modeling engine also adapted to create sub-models from said predetermined model based on data thresholds, wherein a particular sub-model is created if a number of data patterns exceeds one of said thresholds and said particular sub-model is not created if said number of data patterns does not exceed said threshold.

15. The computational modeling engine of claim 14 wherein said computational engine creates a hierarchy of sub-models of increasing resolution.

16. The computational modeling engine of claim 14 adapted to combine of one or more models into a single model for interrogation or optimization.

17. The computational modeling engine of claim 14 wherein at least one of said models is a evaluated and/or ranked directional change coefficient (DCC).

18. The modeling system of claim 14 which allows pruning or addition of sensor data.

19. A computational modeling system comprising:
    a computational engine adapted to be attached to a plurality of independent control systems, each controlling an industrial process, wherein each of said independent control systems receives data from one or more sensors and controls one or more actuators, and wherein said independent controls systems have no exchange of data between systems;
    said computational engine adapted to run at least one predetermined model relating to a data space within said industrial process related to at least some of said independent control systems, said computational engine also adapted to create sub-models from said predetermined model based on data thresholds, wherein a particular sub-model is created if a number of data patterns exceeds one of said thresholds and said particular sub-model is not created if said number of data patterns does not exceed said threshold.

20. The computational modeling system of claim 19 wherein said computational engine allows both independent actions of said independent control systems or dependent actions of said independent control systems.

* * * * *